(12) United States Patent
Beall et al.

(10) Patent No.: US 6,300,266 B1
(45) Date of Patent: Oct. 9, 2001

(54) CORDIERITE STRUCTURES

(75) Inventors: Douglas M. Beall, Painted Post, NY (US); Devi Chalasani, San Diego, CA (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 09/354,813

(22) Filed: Jul. 16, 1999

Related U.S. Application Data

(60) Provisional application No. 60/095,406, filed on Aug. 5, 1998.

(51) Int. Cl.[7] ............ C04B 35/04; C04B 35/10; C04B 35/14
(52) U.S. Cl. ............ 501/119; 264/631; 264/42; 264/43; 264/44; 264/45.9; 264/177.12
(58) Field of Search ............ 501/119; 264/631, 264/42, 43, 44, 45.9, 177.12

(56) References Cited

U.S. PATENT DOCUMENTS

| | | |
|---|---|---|
| 4,772,580 | 9/1988 | Hamanaka et al. . |
| 4,869,944 | 9/1989 | Harada et al. . |
| 4,877,670 | 10/1989 | Hamanaka . |
| 4,950,628 * | 8/1990 | Landon et al. ............ 501/119 |
| 5,030,398 | 7/1991 | Hamanaka et al. . |
| 5,141,686 | 8/1992 | Murtagh . |
| 5,409,870 | 4/1995 | Locker et al. . |
| 5,429,779 | 7/1995 | Locker et al. . |

FOREIGN PATENT DOCUMENTS

| | | |
|---|---|---|
| 19756517 | 6/1998 | (DE) . |
| 0227482 | 7/1987 | (EP) . |
| 0549885 | 7/1993 | (EP) . |
| 0 514 205 B1 | 1/1996 | (EP) . |

* cited by examiner

*Primary Examiner*—Elizabeth D. Wood
(74) *Attorney, Agent, or Firm*—Timothy M. Schaeberle; Anca C. Gheorghiu

(57) ABSTRACT

A plasticizable raw material mixture for use in preparing a substrate having cordierite as its primary phase with the mixture comprised of a chemical composition, percent by weight, of 11 to 17% MgO, 33 to 41% $Al_2O_3$ and, 46 to 53% $SiO_2$. The raw material mixture specifically comprises the following: (1) one source of $Al_2O_3$ and $SiO_2$ comprising a clay mixture having less than about 22%, by weight based on the total raw materials in the plasticizable mixture, of calcined clay; (2) an alumina yielding precursor comprising alumina having an average particle diameter of about 1 $\mu$m or less; and, (3) at least one source of magnesia having an average particle diameter of between about 3 to 15 microns. This invention additionally relates to a method of producing a green body of cordierite-forming materials comprising preparing a plasticizable raw material mixture of the aforementioned composition, adding an organic binder system to the mixture and mixing the mixture to form an extrudable mixture, and extruding the mixture to form a substrate of the desired configuration. The green body is dried and fired to yield a ceramic substrate having cordierite as its primary phase.

15 Claims, 1 Drawing Sheet

CORDIERITE STRUCTURES

This application claims the benefit of U.S. Provisional Application No. 60/095,406, filed Aug. 5, 1998, entitled "Cordierite Strictures" by Beall et al.

BACKGROUND OF THE INVENTION

1. Field of the Invention

The invention relates to a method for preparing high wet-strength, increased crack-resistance, green bodies of cordierite-forming mixtures, to a method for preparing cordierite substrates and to the mixtures of raw materials and processing aids utilized to prepare such high wet-strength, increased crack-resistance green bodies and cordierite substrates.

2. Discussion of the Related Art

The exhaust gases emitted by internal combustion systems utilizing hydrocarbon fuels, such as hydrocarbon gases, gasoline or diesel fuel, can cause serious pollution of the atmosphere. Among the many pollutants in these exhaust gases are hydrocarbons and oxygen-containing compounds, the latter including nitrogen oxides (NOx) and carbon monoxide (CO). The automotive industry has for many years attempted to reduce the quantities of gaseous emissions from automobile engine systems, the first automobiles equipped with catalytic converters having been introduced in the mid 1970's.

Catalytic converters often comprise cordierite substrates, onto which are coated noble metal catalysts. The cordierite substrates arc typically in the form of a honeycomb body or multichannel monolith having substantially parallel cells or passages extending between open end faces thereof. The converter is placed in the path of the exhausteffluent of an automobile engine where the catalysts may act to convert hydrocarbons, CO and NOx to their non-toxic by-products, specifically water, carbon dioxide and reduced nitrogen species.

It is known to those skilled in the art, that a sintered cordierite structure is typically made by mixing raw materials such as talc, calcined and raw kaolin clay, including delaminated clay, alumina, silica, aluminum hydroxide, various inorganic and organic binders and water to form a batch composition. See, for example, the disclosure of U.S. Pat. No. 3,885,977. This composition is then extruded into a honeycomb body. At this stage, before sintering, the honeycomb body is frequently referred to as being "green". As such the term "green" as is used in the art and in this application refers to the state of a formed body or piece made of sinterable powder or particular material that has not yet been fired to the final, desired sintered ceramic product.

Manufacturers work continuously to optimize the characteristics of cordierite substrates to enhance their utility as catalyst carriers. The move toward producing thinner-walled cordierite monoliths or honeycombs, for use as catalyst carriers, has resulted in the following advantages: (1) honeycomb bodies exhibiting lower exhaust vehicle backpressure, which in turn results in an increase in engine power; (2) increased cell density honeycomb bodies which achieve better exhaust gas conversion with no increase in backpressure; and (3) thinner walled honeycomb bodies having less mass results in catalytic converters having faster and improved "light-off". It has also been desirable to optimize the thermal shock resistance and strength of the cordierite substrates. It has been suggested, in U.S. Pat. No. 4,772,580, (Hamanaka et al.) that these properties of cordierite structures can be enhanced by utilizing fine particles of both talc and kaolin in the preparation of the cordierite. Specifically, Hamanaka discloses the use talc particles having an average particle diameter of not greater than 7 $\mu$m and kaolin particles having an average particle size of not greater than 2 $\mu$m. More recently, it has been disclosed in U.S. Pat. No. 5,296,423 (Locker) that high wet and isostatic strength cordierite substrates can be prepared using about five to thirty percent delaminated kaolin coupled with fine particle size minerals of alumina and magnesia, less than 1 and 7 $\mu$m, respectively.

Although the use of such fine raw materials leads to improved green and sintered thinwall honeycomb bodies having acceptable isostatic and wet strength, the demand honeycomb bodies having thinner and thinner cell walls continues. A recent processing innovation which has enabled the formation of thinner wall substrates approaching cell wall sizes of less than 6 mils is disclosed in U.S. Pat. No. 6,080,345 (Chalasani et al.). The process involves the use of a powder mixture, for forming honeycomb structures, that includes inorganic powder materials, binder, solvent for the binder, surfactant, and a component which is non-solvent with respect to the binder, solvent and inorganic powder materials. This powder mixture is mixed, plasticized and shaped to form a green ceramic preform body having improved wet strength and is thus especially suitable for use in the processing of thin walled honeycomb structures. Furthermore, Chalasani discloses a preferred aqueous binder system mixture that includes water, cellulose ether and a hydrophobic non-solvent.

While this Chalasani reference provides significant advances in the capability of the art to form complex, thin-walled ceramic honeycomb bodies through extrusion, the inclusion of this non-solvent in the powder, e.g., light mineral oil, results in additional complications in the "burnout" or removal of the binder. Specifically, difficulties are associated with the removal of the binder components from the shaped ceramic part without incurring distortion or breakage of the part. Specifically, because of the reduced strength of the thin-wall ceramic honeycomb bodies and the corresponding increase in the dimensional changes during binder removal due to the exothermic nature of the removal of the oil, special considerations in the firing of the ceramic honeycomb must be undertaken to avoid cracking of the ceramic body. Specially designed kilns, apparatus for volatile removal, reduced oxygen containing atmospheres and increased, complicated firing cycles are among the numerous means that have been employed to reduce the differential shrinkage and high cracking frequency experienced during the firing of thin-walled ceramic honeycomb bodies which incorporate the aforementioned binder.

There is, accordingly, a clear need for a means for preparing thin-walled cordierite structures which exhibit good wet strength in the green state and that are capable of being fired into a desired ceramic article without high differential shrinkage and incidences of cracking or defects.

SUMMARY OF THE INVENTION

It has been surprisingly found that when reduced levels of certain types of clay are used, in combination with the use fine particle size raw materials in the preparation of cordierite structures, the resulting honeycomb bodies exhibit the above mentioned properties. Specifically, it has been discovered that the use of lowered amounts of calcined kaolin, less than about 22%, in the preparation of cordierite structures, decreases the amount of total liquid required by the batch to maintain the same extrusion pressure. It follows that less liquid is therefore needed to form green bodies exhibiting self-supporting wet strength, and as such, the green bodies formed with this inventive batch mixture exhibit an increased resistance to cracking of the so-formed honeycomb upon firing.

More specifically, this invention relates to a plasticizable raw material mixture for use in preparing a substrate having cordierite as its primary phase with the mixture comprised of a chemical composition, percent by weight, of 11 to 17% MgO, 33 to 41% $Al_2O_3$ and, 46 to 53% $SiO_2$. The raw material mixture specifically comprises the following:

(a) one source of $Al_2O_3$ and $SiO_2$ comprising a clay mixture having less than about 22 %, by weight, based on the total raw materials in the plasticizable mixture, of calcined clay with the remaining source comprising alumina and silica yielding precursors, the alumina yielding precursor comprising alumina having an average particle diameter of about 1 µm or less;

(b) at least one source of magnesia having an average particle diameter of between about 3 to 15 microns.

This invention also relates to an extrudable mixture that comprises the above-mentioned raw material mixture and an organic binder system. Still further, this invention relates to a method of producing a green body of cordierite-forming materials comprising preparing a plasticizable raw material mixture as defined above, adding an organic binder system to the mixture and mixing the mixture to form an extrudable mixture, and extruding the mixture to form a substrate of the desired configuration. The green body is dried and fired to yield a ceramic substrate having cordierite as its primary phase.

DETAILED DESCRIPTION OF THE INVENTION

Figure 1:
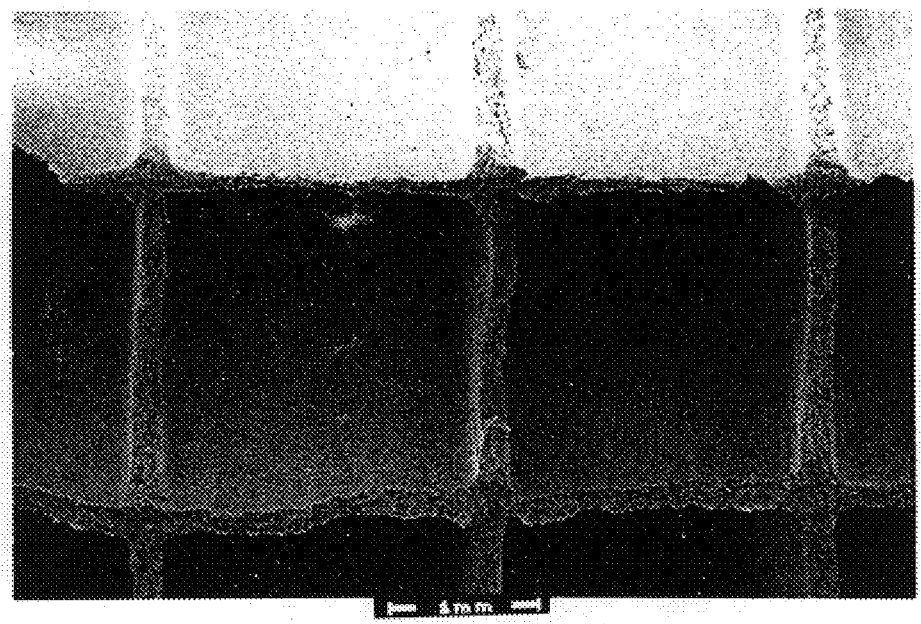
FIG. 1 is a SEM photograph, taken at 40X, of the cell walls of a honeycomb substrate formed utilizing the inventive plasticizable mixture.

The present invention relates to cordierite-containing articles and to a method of producing these articles using an optimized combination of raw materials. The cordierite-containing articles formed by the method of the present invention exhibit a lessened total extrusion vehicle amount necessary to maintain acceptable wet green strength, and as such the so-formed green bodies exhibit an increased resistance to cracking upon firing of the green body to form fired substrates.

Typically, in the preparation of cordierite articles talc and clay raw particles are mixed in proportion with sources of alumina and silica yielding precursors to provide the raw material mixture having a composition, in percent by weight of 11 to 17% MgO, 33 to 41% $Al_2O_3$ and, 46 to 53% $SiO_2$. The invention involved the determination that the necessary amount of liquid, i.e., extrusion vehicle, that is added to the raw material mixture, so as to maintain a sufficiently high level of extrusion pressure is dependent upon the levels of, and the particles size distributions of certain constituents in the batch mixture. Specifically, a study was undertaken to determine the role, and the effect, of certain raw materials in the batch mixture as they relate to the extrusion vehicle liquid demand of the batch required to maintain a constant extrusion pressure. Under normal circumstances a reduction in the level of liquid that is added to a particular raw material mixture results in an increase in the extrusion pressure required to extrude that mixture through a die. However, in the instant case it was determined that the level of calcined clay and the sub-micron alumina particle size have a strong effect in reducing the amount of liquid (i.e., the water and oil in the binder system) necessary to extrude wet green bodies which exhibit sufficiently high degree of wet green strength.

In accordance with the present invention provided is a plasticizable mixture for use in preparing a substrate having cordierite as its primary phase. Specifically, the plasticizable mixture is made up of a raw material mixture specifically comprising the following: one source of $Al_2O_3$ and $SiO_2$ comprising a clay mixture having less than about 22%, and preferably less than about 20% by weight, based on the total raw materials in the plasticizable mixture, of calcined clay. The remaining sources of $Al_2O_3$ and $SiO_2$ comprise alumina and silica yielding precursors with the alumina yielding precursor comprising alumina having an average particle diameter of about 1 µm or less. Furthermore, the batch comprises at least one source of magnesia having an average particle diameter of between about 1 to 15 microns.

In a preferred embodiment the clay mixture comprises a mixture of calcined and raw clay, for example delaminated kaolin, the total comprising less than about 40%, by weight, based on the total raw materials in the plasticizable mixture. Acceptable types of non-delaminated kaolinite raw clay include as Hydrite MP™, Hydrite PX™ or Engelhard CHC. Acceptable delaminated kaolinite includes clays such as KAOPAQUE-10™ (K10) clay. Acceptable calcined clays include Glomax LL, Glomax JDF or Engelhard EBF. Except for the two Engelhard raw materials disclosed above, both of which are sold by Engelhard Corp., Iselin, N.J., all of the above named materials are sold by Dry Branch Kaolin, Dry Branch, Ga.

The alumina-yielding precursor is preferably in the form of an α-alumina or a material that will yield α-alumina on heating. One example of an acceptable alumina- yielding precursor includes the fine alumina A-16SG sold by Alcoa Industrial Chemicals, Pittsburgh, Pa.

In a preferred embodiment the source of magnesia comprises talc, for example the talc sold by Barretts Minerals, under the designation MB 96-67 and having a surface area of about 5–8 $m^2/g$; this material also functions as a silica-yielding precursor.

Another acceptable silica-yielding precursor, for example, includes IMSIL™ sold by Unimin Specialty Minerals Inc., Elco, Ill., having a particle size of about 9–11 micrometers, and a surface area of about 4–6 $m^2/g$.

The raw materials of which the plasticized mixture is comprised are combined in a mixing step sufficient produce an intimate mixing of the raw material phases to allow complete reaction in thermal processing. A binder system is added at this point to help create an extrudable mixture, which is formable and moldable. A preferred binder system for use in the present invention comprises cellulose ether binder component a selected from the group consisting of methylcellulose, methylcellulose derivatives, and combinations thereof, a non-solvent component comprising polyalphal olefin, a surfactant component selected from the group consisting of, stearic acid, ammonium lauryl sulfate, lauric acid, oleic acid, palmitic acid and combinations thereof and a solvent comprising water. Excellent results have been obtained utilizing a binder system which comprises the following amounts, assuming 100 parts by weight of the inorganic raw material mixture: about 2 to 10 parts by weight of the polyalphal olefin, about 0.2 to 2 parts by weight of the surfactant component, about 2.5 to 5 parts by weight of a hydroxypropyl methylcellulose binder, and about 8 to 25 parts by weight of the water.

The individual components of the binder system are mixed with a mass of the inorganic powder material, e.g., the ceramic powder material, in a suitable known manner, to prepare an intimate mixture of the ceramic material and the binder system. For example, all components of the binder system may be previously mixed with each other, and the mixture is added to the ceramic powder material. In this case, the entire portion of the binder system may be added at one time, or divided portions of the binder system may be added one after another at suitable intervals. Alternatively, the components of the binder system may be added to the ceramic material one after another, or each previously prepared mixture of two or more components of the binder system may be added to the ceramic powder material. Further, the binder system may be first mixed with a portion of the ceramic powder material. In this case, the remaining portion of the ceramic powder is subsequently added to the prepared mixture. In any case, the binder system must be uniformly mixed with the ceramic powder material in a predetermined portion. Uniform mixing of the binder system and the ceramic powder material may be accomplished in a known kneading process.

Particularly, in the case of batches for ceramic products, the batch formation takes place in two stages prior to the shaping step. In the first stage or wetting stage of batch formation, the inorganic powder particles, surfactant, and the binder component are dry mixed followed by addition of the solvent such as in a Littleford mixer. The solvent is added in an amount that is less than is needed to plasticize the batch. With water as the solvent, the water hydrates the binder and the powder particles. The non-solvent is then added to the mix to wet out the binder and powder particles. The non-solvent typically has lower surface tension than water. As a result, it wets out the particles more readily than the solvent. At this stage, the powder particles are coated and dispersed by the surfactant, solvent, and non-solvent.

In a preferred embodiment, the plasticization takes place in the second stage. In this stage the wet mix from the first stage is sheared in any suitable mixer in which the batch will be plasticized, such as for example in a twin-screw extruder/mixer, auger mixer, muller mixer, or double arm mixer, etc.

The resulting stiff batch is then shaped into a green body by any known method for shaping plasticized mixtures, such as e.g. extrusion, injection molding, slip casting, centrifugal casting, pressure casting, dry pressing, etc. The invention is best suited for extrusion through a die.

The extrusion operation either vertical or horizontal, can be done using a hydraulic ram extrusion press, or a two stage de-airing single auger extruder, or a twin screw mixer with a die assembly attached to the discharge end. In the latter, the proper screw elements are chosen according to material and other process conditions in order to build up sufficient pressure to force the batch material through the die.

The prepared ceramic green body is then fired at a selected temperature under suitable atmosphere and for a time dependent upon the composition, size and geometry so as to result in a fired body of the desired ceramic. For example, for a composition which is primarily for forming cordierite, the temperatures typically range from about 1300 to about 1450° C. with the holding times at these temperatures ranging from about 1 hour to 8 hours. Firing times and temperatures depend upon factors such as kinds and amounts of materials and the type of equipment utilized but typical total firing times range between about 20 to 80 hours.

The formed wet green body is then dried. The body may be dried by any conventional method such as hot-air drying or dielectric drying, with dielectric being the preferred method.

The firing range for the formed cordierite body should be 1340–1440° C. with a soak time sufficient to yield a substantially complete reaction to the cordierite phase; Soak times of 6–12 hours may be used. The resulting fired body, preferably, at least about 95% by weight cordierite.

As previously mentioned, it has been found that by utilizing a cordierite-forming batch mixture which includes a clay mixture having less than about 22%, by weight calcined clay in combination with an alumina-yielding precursor comprised of sub-micron alumina, the batch exhibits a low-liquid demand. In other words, the batch requires a reduced amount of extrusion vehicle, e.g. water and oil, in the organic binder system while still maintaining the desirable high degree of wet strength of the extrudate. The lower oil content of the composition results in a wet green substrate, which is far easier to dry and fire into a ceramic body, without the formation of cracks. Furthermore, the low-liquid demand composition exhibits a reduced propensity toward differential flow through the die during the extrusion operation. This resistance to differential flow during extrusion results in a reduction in the defects associated therewith; specifically, the inventive batch, in its wet state, is not subject to regions of differential flow which cause buckling and the wavy pattern responsible for the "swollen webs".

As indicated previously, a primary utility of the mixtures described herein is for preparing high strength cordierite honeycomb substrates useful a catalyst carriers. Although the invention is particularly advantageous for preparing thin-walled honeycombs, the claimed mixtures can also be used for thicker walled strictures. The mixtures may also be useful for preparing other high strength cordierite structures, as well, such as filters.

EXAMPLES

To further illustrate the principles of the invention of the present invention, there will be described several examples of the binder system according to the invention. However, it is to be understood that the examples are given for illustrative purpose only, and the invention is not limited thereto, but various modifications and changes may be made in the invention, without departing from the spirit of the invention.

Examples 1–2

Two inorganic powder batch mixtures suitable in the formation of a cordierite ceramic body are listed in TABLE I and are as listed in percent by weight; composition 1 being inventive and composition example 2 being included for comparison purposes. Each of compositions 1 and 2 were prepared by combining and dry mixing together the components of the designated inorganic mixture as listed in TABLE I. An amount of the organic binder system listed in TABLE I is then added to each of the inorganic dry mixtures and thereafter further mixed to form a plasticized ceramic batch mixture. Each of these 2 different plasticized ceramic batch mixtures comprised differing amounts of the binder system components, as detailed in TABLE I; specifically, 30.9 parts by weight, for Composition 1 and 35.9% parts by weight, for Composition Example 2, based on 100 parts total inorganics. Durasyn 162, a polyalphal olefin was the type of oil utilized as the non-solvent for both composition examples 1 and 2.

TABLE I

|  | Example 1 | Example 2 |
| --- | --- | --- |
| INORGANICS |  |  |
| Talc | 40.67 | 40.79 |
| Calcined Clay | 16.43 | 27.00 |
| Raw Clay | 10.39 | 14.82 |
| Coarse Alumina | 11.15 | 15.40 |
| Fine α-alumina | 11.15 | — |
| Silica | 10.22 | 2.00 |
| ORGANIC BINDER SYSTEM |  |  |
| Methocel | 2.7 | 2.7 |
| Stearic Acid | 0.8 | 0.6 |
| Water | 22.4 | 23.4 |
| Oil | 5.0 | 9.2 |
| Firing Cracks (%) | 26 | 68 |
| Stiffness (kg/mm) | 3.1 | 3.0 |
| Swollen Webs | None | Yes |

Each of the various plasticized mixtures were extruded through a twin screw extruder under conditions suitable to form a 350 cell/in. ceramic honeycomb substrate exhibiting a diameter of 5.66", a cell wall size of 5 mils and a length of 4". Ceramic honeycomb green bodies were formed from each of the 2 batch compositions and approximately 90 ceramic honeycombs for each of the 2 compositions were subjected to a heating and firing cycle sufficient to remove the organic binder system from, and to sinter, the honeycomb substrates. The total number of pieces exhibiting cracks for each of the 2 firing cycles (one total for each of the compositions) was divided by the total number of substrates fired for that composition to arrive at a crack percentage value for the composition; that number is recorded in TABLE I as %. An examination of the TABLE shows that the Composition 1 substrate which incorporated a calcined clay amount of 16.43% and utilized 11.15% of fine alumina exhibited a reduced amount of crackage; specifically the substrate comprised of composition 1 exhibited 26% cracking while the substrate comprised of the comparison composition exhibited 68% cracking.

Figure 2:
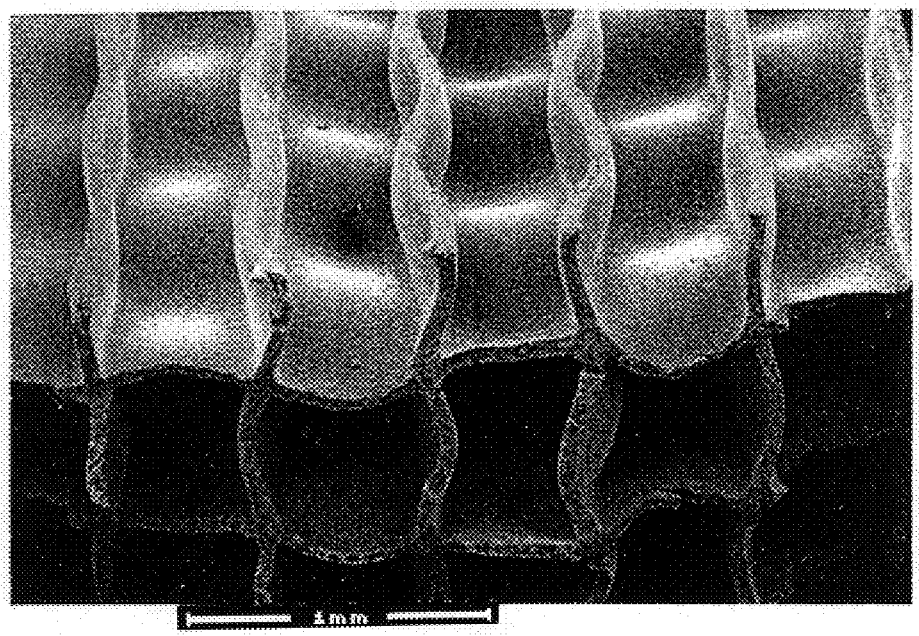
FIG. 2 is a SEM photograph, taken at 20X, of the cell walls of a honeycomb substrate formed utilizing the comparison plasticizable mixture.

Each of the substrates formed was also examined for the presence of "swollen webs" as a measure of extrusion performance. An examination and comparison of FIGS. 1 and 2, SEMs showing cell walls of a honeycomb substrate for each of the inventive and comparison plasticizable mixture, respectively, reveals that Composition 2 substrate exhibited swollen webs while inventive Composition 1 exhibited no swollen webs. This likely indicates that the batch of comparison Composition 2 exhibited undesirable differential flow during wet batch mixture extrusion while low calcined clay/sub micron alumina Composition 1 did not.

Two additional plasticized ceramic batch mixtures comprised of the same compositions as detailed above were extruded through a capillary rheometer to form ribbons exhibiting a thickness of about 3.1 mm (⅛") The intrinsic material stiffness or wet green strength of the formed ribbons was measured by applying a load to a piston at a given velocity and measuring the deformation of the ribbon (Load/Deformation ((L/D) and the values obtained were reported in TABLE I. An examination of the stiffness values reported in TABLE I reveals that Composition 1 ribbon possesses a comparable deformation/higher stiffness when compared to the ribbon of comparison Composition 2; i.e., 3.1 vs. 3.0 kg-mm.

As these examples show, incorporation of calcined clay amounts of less than about 22% in combination with sub-micron alumina into the batch mixture significantly reduces the amount of liquid necessary as the extrusion vehicle to form green bodies having a sufficiently high enough wet strength to resist cracking upon the firing to form a ceramic body.

We claim:

1. An extrudable mixture for use in preparing a substrate having cordierite as its primary phase and having a chemical composition, in percent by weight, of 11 to 17% MgO, 33 to 41% $Al_2O_3$ and, 46 to 53% $SiO_2$, the mixture comprising:
   (a) one source of $Al_2O_3$ and $SiO_2$ comprising a clay mixture having less than about 22%, by weight, based on the total raw materials in the plasticizable mixture, of calcined clay with the remaining source comprising alumina and silica yielding precursors, the alumina yielding precursor comprising alumina having an average particle diameter of about 1 μm or less;
   (b) at least one source of magnesia having an average particle diameter of between about 1 to 15 microns
   (c) a binder system comprising a cellulose ether binder component, a light mineral oil component, a surfactant component and a solvent component.

2. The mixture of claim 1 wherein the calcined clay comprises less than about 20%, by weight, based on the total raw materials in the plasticizable mixture.

3. The mixture of claim 1 wherein the clay mixture comprises a mixture of calcined and raw clay, the total comprising less than about 40%, by weight, based on the total raw materials in the plasticizable mixture.

4. The mixture of claim 1 wherein the source of alumina comprises α-alumina.

5. The mixture of claim 1 wherein the source of magnesia comprises talc.

6. The mixture of claim 1 wherein the binder system comprises about 2 to 10 parts by weight of a polyalphal olefin as the light mineral oil component, about 0.2 to 2 parts by weight of the surfactant component, about 2.5 to 5 parts by weight of the cellulose ether binder component, and about 8 to 25 parts by weight of the water, for 100 parts by weight of the powdered raw materials.

7. A method of producing a green substrate that, upon sintering will yield a ceramic substrate having cordierite as its primary phase, comprising:
   preparing a plasticizable inorganic raw material mixture having a chemical composition comprising, percent by weight, 33 to 41%, $Al_2O_3$, 46 to 53% $SiO_2$, and 11 to 17% MgO, the mixture comprising the following raw materials:
      (a) one source of $Al_2O_3$ and $SiO_2$ comprising a clay mixture having less than about 22 parts calcined clay with the remaining source comprising alumina and silica yielding precursors with the alumina yielding precursor comprising alumina having an average particle diameter of about 1 μm or less;
      (b) at least one source of magnesia having an average particle diameter of between about 1 to 15 microns;
   adding an organic binder system to the inorganic mixture and kneading the mixture to form an extrudable mixture, the binder system comprising a cellulose ether binder component, a light mineral oil component, a surfactant component and a solvent component;
   extruding the extrudable mixture to form the green substrate.

8. The method of claim 7 wherein the calcined clay comprises less than about 20%, by weight, based on the total raw materials in the inorganic raw material mixture.

9. The method of claim 7 wherein the clay mixture comprises both calcined and delaminated kaolin comprising less than about 40%, by weight, based on the total raw materials in the inorganic raw material mixture.

10. The method of claim 7 wherein the organic binder system comprises the cellulose ether binder component selected from the group consisting of methylcellulose, methylcellulose derivatives, and combination thereof, the light mineral oil component comprising polyalphal olefin, the surfactant component selected from the group consisting of, stearic acid, ammonium lauryl sulfate, lauric acid, oleic acid, palmitic acid and combinations thereof and the solvent comprising water.

11. The method of claim 7 wherein the inorganic raw material mixture comprises 100 parts by weight and about 2 to 10 parts by weight of the polyalphal olefin, about 0.2 to 2 parts by weight of the surfactant component, about 2.5 to 5 parts by weight of the cellulose ether binder component, and about 8 to 25 parts by weight of the water.

12. The method of claim 7 wherein the source of magnesia comprises talc.

13. The method of claim 7 wherein the source of alumina comprises $\alpha$-alumina.

14. The method of claim 7 wherein the green substrate is dried and fired at a temperature and for a time sufficient to yield a ceramic substrate having cordierite as its primary phase.

15. The method of claim 7 in which the green substrate is a honeycomb monolith.

* * * * *